(12) United States Patent
Gannon et al.

(10) Patent No.: US 6,251,266 B1
(45) Date of Patent: Jun. 26, 2001

(54) SUCTION TUBE INLET WITH STRAINER

(76) Inventors: Joseph C. Gannon, 4200 Boise St., #3A, Bakersfield, CA (US) 93306; Sean P. Crane, 251 Panorama Dr., Bakersfield, CA (US) 93305

(*) Notice: Subject to any disclaimer, the term of this patent is extended or adjusted under 35 U.S.C. 154(b) by 0 days.

(21) Appl. No.: 09/536,152

(22) Filed: Mar. 28, 2000

(51) Int. Cl.[7] .................................................. B01D 35/05
(52) U.S. Cl. ...................... 210/122; 210/170; 210/242.1
(58) Field of Search ................................... 210/122, 170, 210/242.1, 460

(56) References Cited

U.S. PATENT DOCUMENTS

| | | | | |
|---|---|---|---|---|
| 1,644,248 | * | 10/1927 | Goldman | 210/242.1 |
| 1,955,308 | * | 4/1934 | Naftel et al. | 210/242.1 |
| 2,597,728 | * | 5/1952 | Hink | 210/242.1 |
| 2,957,579 | * | 10/1960 | McCombie | 210/242.1 |
| 3,109,812 | * | 11/1963 | McAuley et al. | 210/242.1 |
| 3,782,552 | * | 1/1974 | Wendell | 210/242.1 |
| 4,179,379 | * | 12/1979 | Mitchell | 210/242.1 |
| 4,647,374 | * | 3/1987 | Ziaylek et al. | 210/242.1 |
| 4,973,453 | * | 11/1990 | Kozey | 210/170 |
| 5,108,591 | * | 4/1992 | Hagan | 210/122 |
| 5,118,412 | * | 6/1992 | Schmidt | 210/122 |
| 5,358,644 | * | 10/1994 | Dennis | 210/242.1 |

\* cited by examiner

*Primary Examiner*—C. Upton
(74) *Attorney, Agent, or Firm*—C. C. Shroff; Papan Devnani, Esq.

(57) ABSTRACT

A float inlet, comprising an upper anti-vortex plate; a lower scour guard plate; and at least one float connected to the upper plate, where the float supports the upper plate in a body of water so that the upper plate is parallel to the surface of the body of water. The upper and lower plates are separated by a fixed distance, so as to allow water to flow between the upper and lower plates. A tube passes through a hole in the upper plate. The tube has a first open end above the upper plate which is adapted to connect to a suction hose and a second open end positioned between the upper and lower plates. A strainer covers the second open end of the tube. When the inlet is positioned in a body of water, the float supports the upper plate so that the strainer is positioned just below the surface of the water. The suction tube may then be used to draw water from the body of water. The upper anti-vortex plate prevents formation of a vortex on the surface of the water while suction is applied.

10 Claims, 3 Drawing Sheets

US 6,251,266 B1

SUCTION TUBE INLET WITH STRAINER

BACKGROUND OF THE INVENTION

The present invention relates generally to portable suction tube inlet devices which float in a body of water so that the suction tube may withdraw water from the body of water from a point which is just beneath the surface of the body of water. Additionally, the present invention relates to suction tube inlet devices which withdraw water from a body of water without causing a vortex or whirlpool effect on the surface of the water. Further, the present invention relates generally to suction tube inlet devices which withdraw water from a body of water while preventing the flow of water toward the inlet device from stirring up particulate matter and sediment from beneath the float and carrying it to the inlet device. This last point is particularly important in the later stages of draining a body of water, when the floating inlet device is near the bottom of the body of water.

The best way for withdrawing substantially clean water from a pond or other body of water containing substantial amounts of sediment and suspended solids is to withdraw water from the surface of the body of water. Gravity draws sediment and suspended solids, which have a higher specific gravity than water, downward toward the bottom of the pond. Thus, the water nearest the surface is the "cleanest" water; that is, it has the lowest concentration of sediment and suspended solids.

A variety of filtering devices for withdrawing substantially clean water from a body of water containing particulate matter, such as sediment ponds, trenches, and waste water ponds, have been described over the years. In 1879, for example, U.S. Pat. No. 222,140 disclosed a floating filter having a buoyant chamber and a filtration chamber. This system, however, does not effectively prevent formation of a vortex on the surface of the water, or protect the inlet of the filtration chamber from particulates. Over a century later, in U.S. Pat. No. 5,052,855, a method of using a float to support the end of a suction tube just beneath the surface of a body of water was described. The end of the suction tube was covered with a filter to prevent particulates from entering the tube. However, the suction tube in this device was connected to a pump for applying suction to the tube through an underground passage. This makes the device inconvenient to install. Additionally, the device, once installed, is not portable.

It is an object of the present invention to provide portable suction tube inlet devices which float just beneath the surface of a body of water so that the suction tube may withdraw water from the body of water without disturbing subsurface particulate matter. It is a further object of the present invention to provide suction tube inlet devices which withdraw water from a body of water without causing a vortex on the surface of the water. It is a third object of the present invention to provide suction tube inlet devices which prevent particulate matter and sediment from beneath the float from being carried to the suction tube inlet.

SUMMARY OF THE INVENTION

These objectives are achieved by the present invention, which is a floating suction tube inlet featuring an upper anti-vortex plate; a lower scour guard plate; and at least one float connected to the upper plate. The float supports the upper plate in a body of water so that the upper plate is parallel to the surface of the body of water. The upper and lower plates are separated by a fixed distance, so as to allow water to flow between the upper and lower plates. A tube passes through a hole in the upper plate. The tube has a first open end above the upper plate which is adapted to connect to a suction hose and a second open end positioned between the upper and lower plates. A strainer covers the second open end of the tube. When the inlet is positioned in a body of water, the float supports the upper plate so that the strainer is positioned just below the surface of the water. The suction tube may then be used to draw water from the body of water. The upper anti-vortex plate prevents formation of a vortex on the surface of the water while suction is applied.

The present invention also provides a system for draining water from a body of water, featuring the a floating suction tube inlet described above; a suction hose which connects to the tube passing through the upper plate of the floating suction tube inlet; and a means for applying suction to the suction hose (i.e., a vacuum pump). Additionally, the invention may comprise an optional float adapted to prevent the suction hose from sinking beneath the surface of the water.

DESCRIPTION OF THE PREFERRED EMBODIMENTS

Figure 1:
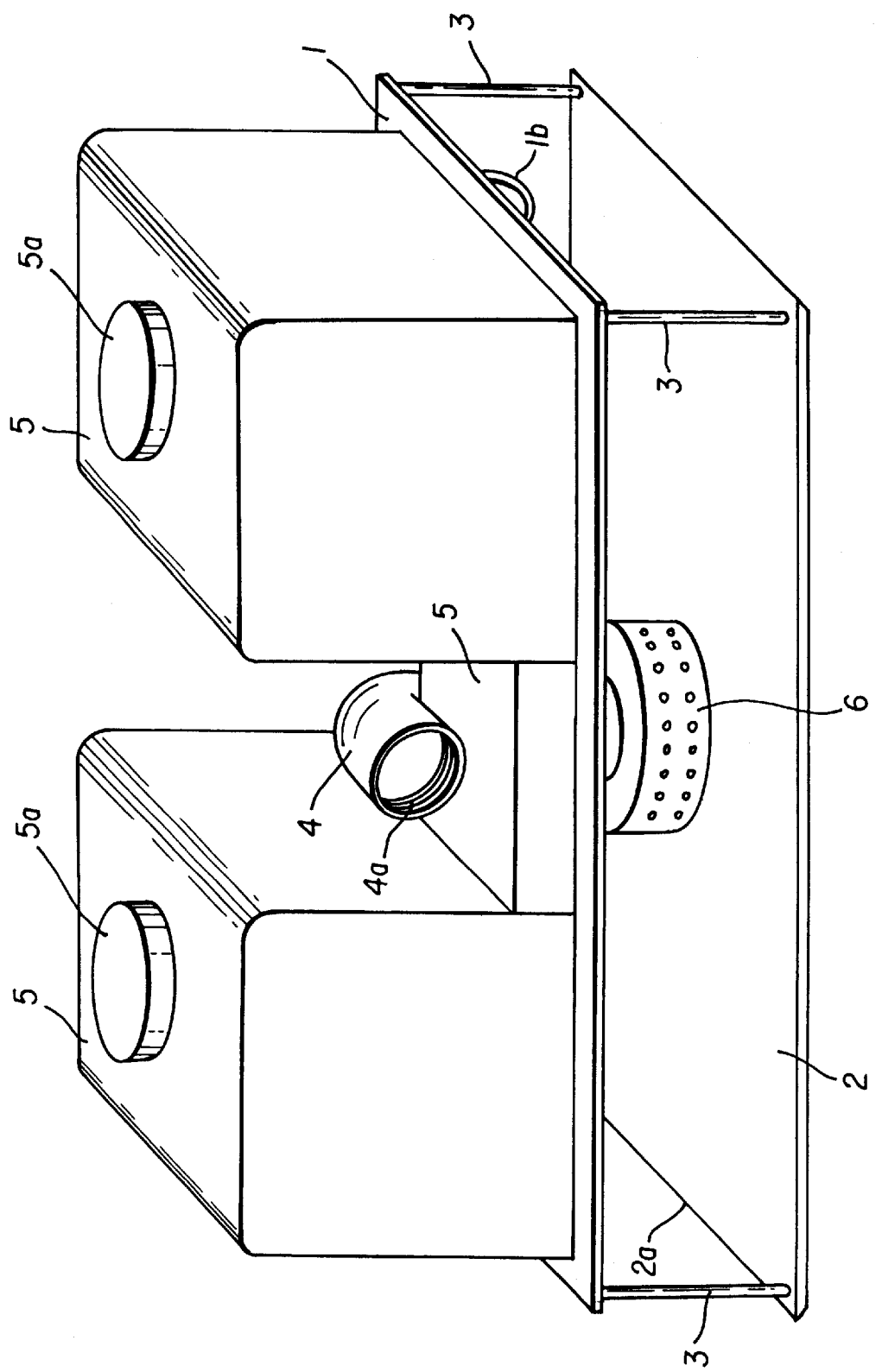
FIG. 1 shows the inventive suction tube inlet.

The invention, shown in FIG. 1, features an upper plate 1, the anti-vortex plate, and a lower plate 2, the scour prevention plate. Upper plate 1, includes a top side 20 and a bottom side 22. Lower plate 2 includes a top side 24 and a bottom side 26. Plates 1 and 2 are parallel to each other, and are separated by a fixed distance. Preferably, the plates are square or rectangular and have identical dimensions, although they may be round as well, if desired. The plates may be separated from each other by a set of rigid plate separator rods 3, as in FIG. 1. These rods are perpendicular to plates 1 and 2, and each have one end which is fixed to a corner of plate 1 and a second end which is fixed to a corresponding corner of plate 2. A rod is fixed in this way to each corner of plate 1 and each corner of plate 2. If plates 1 and 2 are round, rods 3 may be evenly spaced around the periphery of plates 1 and 2. Other means of separating plates 1 and 2 may be used if desired; the only requirement is that water be able to flow between plates 1 and 2 when they are immersed in a body of water. A float or floats 5 mounted to the upper surface of plate 1 causes the apparatus to float in the body of water so that plate 1 is at or only very slightly beneath the surface of the water.

Figure 2:
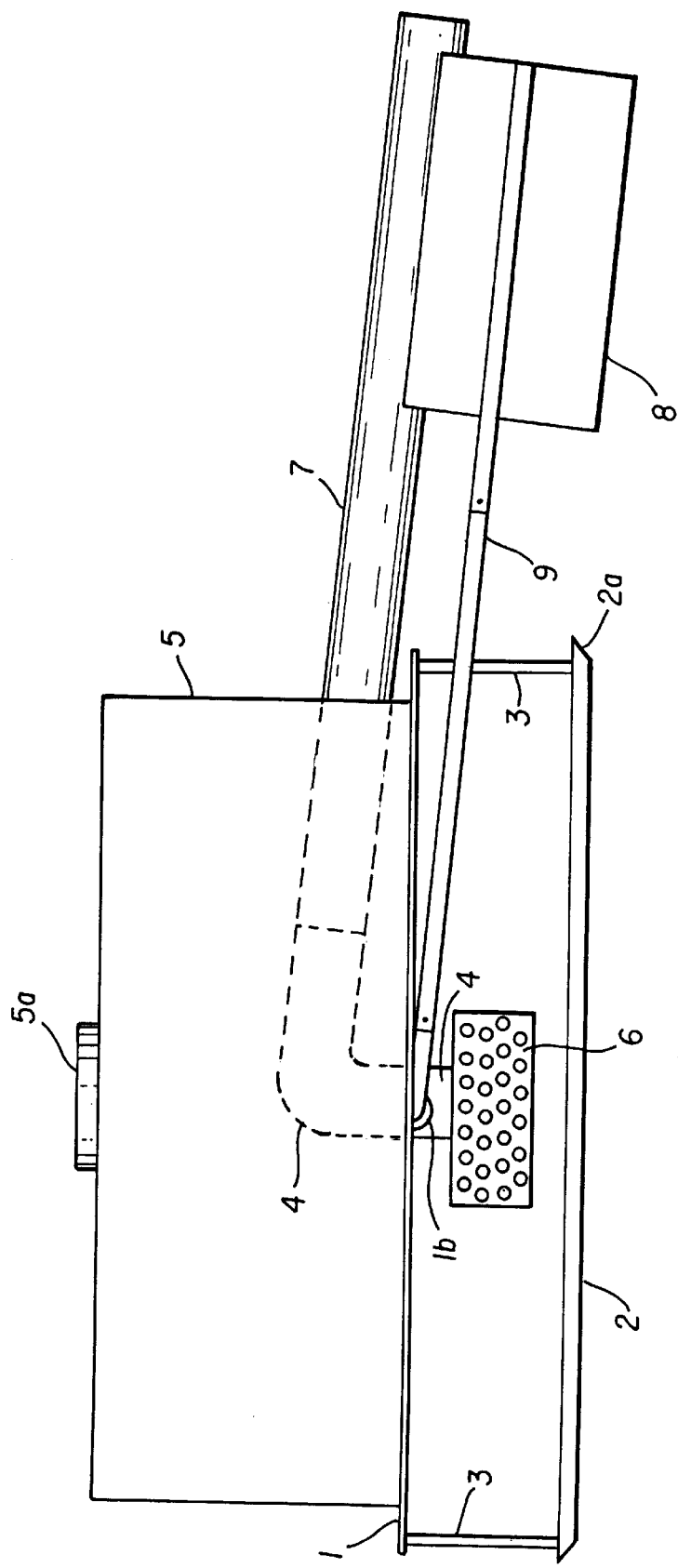
FIG. 2 shows the inventive suction tube inlet in conjunction with a suction hose and a float designed to support the suction hose.
Figure 3A:
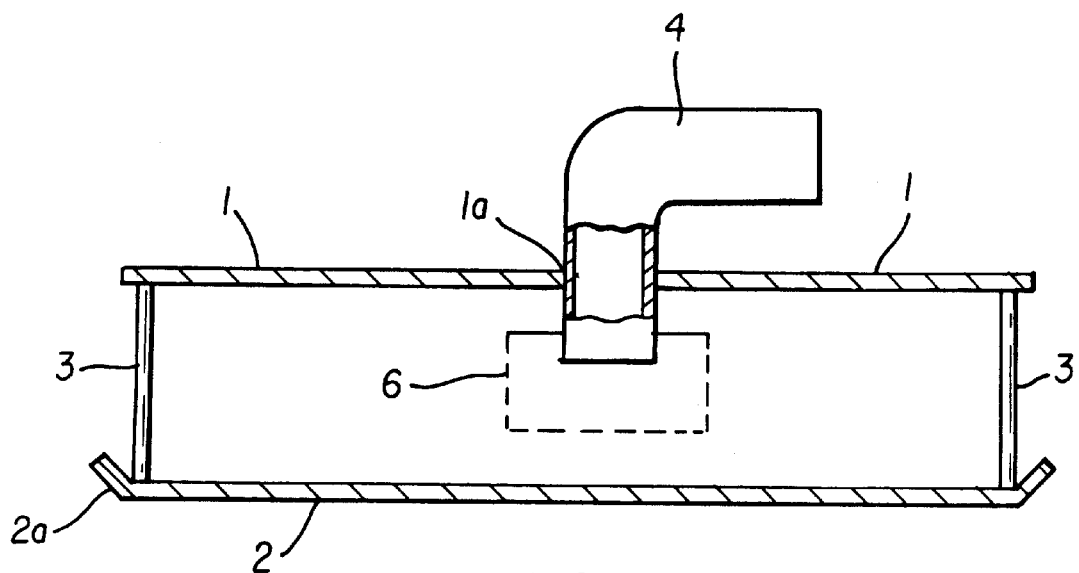
FIGS. 3a and 3b show cross-sectional views of the inventive suction tube inlet which illustrate two ways of connecting a fitting adapted to receive the suction hose to the apparatus of FIG. 1.

Anti-vortex plate 1 has a hole 1a through its center (FIG. 3a). A tube 4 passes in a leakproof fashion through this hole. The lower end of this tube is open, and is positioned approximately midway between plates 1 and 2. The upper end of the tube is also open, and terminates in a fitting 4a adapted to receive the end of a suction hose 7 (FIG. 2). If desired, the tube may be straight; however, this causes the hose to approach the fitting perpendicularly to plate 1. Since the hose approaches the apparatus from the shore when it is in use in a body of water, the hose must be elevated above the surface of the water, and then bent downward at an angle of about 90 degrees to couple with the fitting. This places substantial torque on the hose. This torque can be minimized by placing a 90-degree bend in the tube 4 between plate 1 and fitting 4a. This allows the hose to approach the fitting 4a from a direction that is parallel to plate 1. The lower end of the tube 4 is covered by an inlet strainer 6. The strainer 6 allows water to enter tube 4 when suction is applied through the suction hose, but prevents debris from entering tube 4 and traveling through the suction hose and fouling the pump used to apply vacuum to the hose.

The size of plates 1 and 2 is dependent on the diameter of the suction hose attached to tube 4. The quantity of water flowing into the suction hose, which is dependent on the size of the suction hose, is a key determinant on the size of a vortex forming on the surface of the water. The anti-vortex plate 1 acts to prevent water at the surface of the water from flowing downward toward suction hose 7, as such downward flow creates a surface vortex. As the flow into the suction hose increases, it is necessary to increase the size of plate 1. Typically, for a square anti-vortex plate, if each side of the plate is eight times the diameter of the suction hose, no vortex will appear under normal operating conditions. Similarly, for a round anti-vortex plate, if the diameter of the plate is eight times the diameter of the suction hose, no vortex will appear.

The size and weight of float or floats 5 is dependent on the size and weight of the entire unit. Float(s) 5 should be large enough to support plates 1 and 2 so that plate 1 is at or just beneath the surface of the water. Block or cylindrical floats may be used. The floats may take the form of air-filled chambers, as in FIG. 1. These floats have openings in their upper surface to allow air to fill the chambers. Once the chambers have been filled with air, the openings in the chamber may be sealed with float caps 5a. Varying amounts of air and water within the floats or chambers 5 determines the overall depth at which the apparatus, specifically the inlet strainer 6, is disposed underwater. Thus the invention can be used in different situations where the depth of the undesirable material on the surface of the water varies from place to place or from time to time. This feature allows the instant invention to be used in a large number of environments. Alternatively, the floats may be blocks of some material having a density which is less than that of water. A closed-cell polymeric foam material having a water-proof outer skin may be used.

Figure 3B:
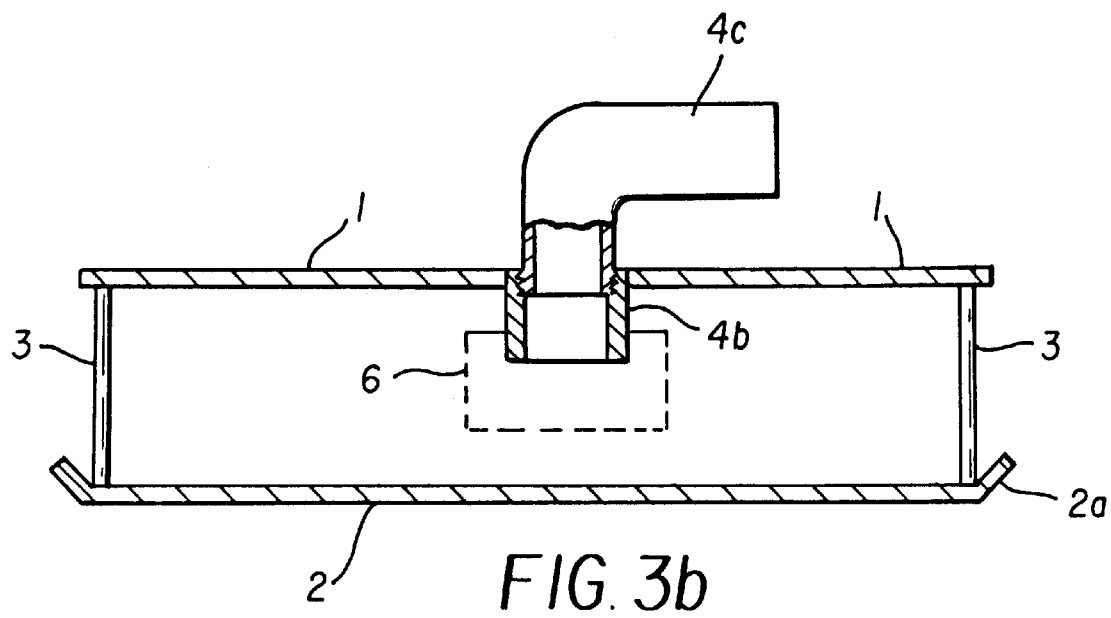

Tube 4 may be made from a single piece of tubing which passes through hole 1a (FIG. 3a). The outer surface of tube 4 is then sealed to the edge of hole 1a (i.e., by welding). Alternatively, and preferably, tube 4 is made from a bulkhead fitting 4b and a 90-degree fitting 4c (FIG. 3b). Bulkhead fitting 4b is connected to the underside of plate 1, and the upper end of 4b seals hole 1a in plate 1. The lower end of 4b is connected to strainer 6. 90-degree fitting 4c is connected to the upper end of fitting 4b. This may be done by screwing a male joint on the end of fitting 4c into a female joint on the end of fitting 4b.

Scour prevention plate 2 has a lip 2a along the periphery of plate 2. The lip 2a is turned upwards toward plate 1 at an angle of between 45 and 90 degrees (FIG. 1). The lip helps prevent sediment from entering the space between plates 1 and 2 when the apparatus is submerged. This is particularly important when the unit is resting at or near the bottom of a body of water.

If suction hose 7 is very long, a hose float 8 may be attached to the suction hose 7. The hose float adds stability to the system by supporting the hose at or near the surface of the water, causing the hose to approach the floating inlet approximately parallel to the surface of the water. For additionally stability, hose float 8 may be maintained at a fixed distance from plate 1 by strut 9. Together, float 8 and strut 9 prevent the hose from sinking into the water under its own weight. This is undesirable because, if the hose is heavy enough, it can radically tilt the floating suction tube inlet.

The component parts of the unit may be made from a wide variety of materials. Plates 1 and 2 may be made from rigid plastic (i.e., polystyrene or polypropylene), wood, stainless steel, or aluminum. Tube 4 may be made from rubber, rigid plastic, stainless steel, or aluminum. The strainer 6 may be made from a metal sieve, or a sheet of metal having fine holes therethrough. In general, the choice of materials depends upon cost weight, and the operating environment. In the case of sediment basins having neutral pH values (pH=6–8, for example), plastic and aluminum are preferred materials, as they are inexpensive and light-weight. However, they might not be able to withstand strongly acidic or caustic environments (i.e., a low pH leach pit at a mine). In such environments, stainless steel might be preferable, despite its higher cost and weight, because it can withstand harsh environments.

The utility of this device is not limited to draining bodies of water. The facts that (a) the inlet of tube 4 is just beneath the surface of the water, and (b) the device creates minimal vortex, or surface disturbance, in the water, means that it can be used to separate water from non-emulsified organic liquids which are less dense than water. Such liquids include oil and gasoline. Due to their low density, these liquids tend to separate from water and float on top of water. By manipulating the density of floats 5, the suction tube inlet may be adapted to float on the water layer with the inlet of tube 4 beneath the water/organic liquid interface. The water may then be withdrawn through the suction hose, substantially without disturbing the layer of organic liquid.

INDUSTRIAL APPLICABILITY

This apparatus has utility in removing substantially clean water from waste water ponds or bodies of water into which organic liquids have been spilled, so that toxic impurities in sediment or organic fluids may be treated. The removed water may be purified if necessary, and then returned to the environment.

What is claimed is:

1. A float inlet for floating in a body of water, comprising:
 a) an upper anti-vortex plate having an upper plate top side and an upper plate bottom side;
 b) a lower scour guard plate having a lower plate top side and a lower plate bottom side;
 c) at least one float connected to said top side of said upper plate, said float supporting said upper plate in a body of water so that said upper plate is parallel to the surface of the body of water;
 d) a means for separating said upper and said lower plates by a fixed distance, while allowing water to flow between said upper and said lower plates;
 e) a tube passing through a hole in said upper plate, said tube having a first open end above said upper plate which is adapted to connect to a suction hose and a second open end positioned between said upper and said lower plates; and
 f) a strainer surrounding said second open end of said tube and where said strainer is located entirely between said bottom side of said upper plate and said top side of said lower plate and further whereby said strainer is held below the surface of the body of water.

2. The apparatus of claim 1, wherein said upper and said lower are rectangular and have substantially identical dimensions.

3. The apparatus of claim 2, wherein said upper and said lower plates are held a fixed distance apart by a set of four support rods, each of said support rods having a first end that is fixed to a defined corner of said upper plate and a second end which is fixed to a corresponding corner of said bottom plate.

4. The apparatus of claim 2, wherein all four sides of said lower plate have a lip which is turned and extends towards said upper plate at an angle between 45 to 90 degrees.

5. The apparatus of claim 1, wherein said tube passing through said hole in said upper plate is bent at a 90-degree angle at a point between said first open end of said tube and a point where said tube passes through said upper plate.

6. The apparatus of claim 1, wherein said strainer is adapted to prevent particulate matter from entering said tube.

7. An apparatus for drawing water from a body of water, comprising:
   (a) a suction hose;
   b) a means for sucking water through the suction hose;
   c)) a float inlet including
      i) an upper anti-vortex plate having an upper plate top side and an upper plate bottom side;
      ii) a lower scour guard plate having a lower plate top side and a lower plate bottom side;
      iii) a pair of separate floats connected to said top side of said upper plate, said pair of floats supporting said upper plate in a body of water so that said upper plate is parallel to the surface of the body of water;
      iv) a means for separating said upper and said lower plates by a fixed distance, while allowing water to flow between said upper and said lower plates;
      v) a tube passing through a hole in said upper plate, said hole being located between said pair of floats, said tube having a first open end above said upper plate which is adapted to connect to a suction hose and a second open end positioned between said upper and said lower plates; and
      vi) a strainer surrounding said second open end of said tube and where said strainer is located entirely between said bottom side of said upper plate and said top side of said lower plate and further whereby said strainer is held below the surface of the body of water.

8. The apparatus of claim 7, wherein said upper and said lower are rectangular and have substantially identical dimensions.

9. The apparatus of claim 7, wherein said tube passing through said hole in said upper plate is bent at a 90-degree angle at a point between said first open end of said tube and a point where said tube passes through said upper plate.

10. The apparatus of claim 7, wherein said strainer is adapted to prevent particulate matter from entering said tube.

\* \* \* \* \*